US007742602B2

(12) United States Patent
Ishidoshiro et al.

(10) Patent No.: US 7,742,602 B2
(45) Date of Patent: Jun. 22, 2010

(54) CIPHER KEY SETTING SYSTEM, ACCESS POINT, WIRELESS LAN TERMINAL, AND CIPHER KEY SETTING METHOD

(76) Inventors: Takashi Ishidoshiro, c/o Buffalo Inc., 15, Shibata Hondori 4-chome, Minami-ku, Nagoya-shi, Aichi, 457-8520 (JP); Yoshiteru Tamura, c/o Buffalo Inc., 15, Shibata Hondori 4-chome, Minami-ku, Nagoya-shi, Aichi, 457-8520 (JP)

( * ) Notice: Subject to any disclaimer, the term of this patent is extended or adjusted under 35 U.S.C. 154(b) by 997 days.

(21) Appl. No.: 10/956,266

(22) Filed: Sep. 30, 2004

(65) Prior Publication Data
US 2005/0132193 A1    Jun. 16, 2005

(30) Foreign Application Priority Data
Dec. 5, 2003    (JP) .............................. 2003-408011

(51) Int. Cl.
*H04K 1/00* (2006.01)
(52) U.S. Cl. ...................................... 380/270; 380/273
(58) Field of Classification Search ................ 380/270, 380/273, 274, 258, 277, 278
See application file for complete search history.

(56) References Cited

U.S. PATENT DOCUMENTS

| | | | |
|---|---|---|---|
| 5,341,427 A | | 8/1994 | Hardy et al. |
| 7,277,547 B1 * | | 10/2007 | Delker et al. ................ 380/270 |
| 2003/0219129 A1 | | 11/2003 | Whelan et al. |
| 2007/0286425 A1 * | | 12/2007 | Adachi et al. ............... 380/274 |

FOREIGN PATENT DOCUMENTS

| | | |
|---|---|---|
| EP | 1035684 A2 | 9/2000 |
| EP | 1035684 A3 | 9/2000 |
| JP | 2000-261427 A | 9/2000 |
| JP | 2001-189722 A | 7/2001 |
| JP | 2001-320373 | 11/2001 |
| JP | 2001-345819 | 12/2001 |
| WO | WO-02/100065 A1 | 12/2002 |

OTHER PUBLICATIONS

Communication dated Apr. 6, 2005 including European Search Report dated Feb. 18, 2005 (total 3 pages).
Japanese Notice of the reason for refusal, dated Apr. 6, 2010.
Takeyoshi Yamada "Nikkei Network" pp. 62-75, published on Nov. 2003.

* cited by examiner

*Primary Examiner*—Kimyen Vu
*Assistant Examiner*—Edward Zee

(57) ABSTRACT

The invention intends to achieve new additions of terminals that use a wireless LAN with a simple process, while preventing leakage of data indicating cipher keys. The access point is notified of the cipher systems adaptable to the terminals. The access point narrows the cipher systems adaptable to itself, sets the cipher keys and notifies them, and also determines the station IDs for the cipher keys each. Thereafter, when the access point modifies the cipher systems based on the security policy, the access point adopts the station IDs corresponding to the cipher systems each. Therefore, the terminals specify the cipher systems based on the station IDs, and perform wireless communications by using the cipher keys notified in advance.

5 Claims, 10 Drawing Sheets

CIPHER KEY SETTING SYSTEM, ACCESS POINT, WIRELESS LAN TERMINAL, AND CIPHER KEY SETTING METHOD

BACKGROUND OF THE INVENTION

1. Field of the Invention

The present invention relates to a technique that sets a cipher system and a cipher key used for enciphering prior to communication wireless communication data exchanged by wireless between a wireless LAN access point and a terminal with a wireless LAN interfacing device to the access point and the terminal.

2. Description of the Related Art

The wireless LAN access point such as a repeater and a router has increasingly been used as a device for connecting remotely located multiple computers to the Internet not only in a place such as a private house, office, etc., where specified persons work continuously (hereunder, this place will be called a private space), but also in a place such as a hotel, air port, shopping district, park, station, etc., where unspecified and numerous people are in action temporarily (hereunder, this place will be called a public space). For example, a service is proposed which connects the access point to a broadband network that realizes a high-speed Internet interfacing service such as an xDSL line or a CATV line while locating the access point to a public space, and thereby provides a space (hereunder, called a free spot) where unspecified and numerous people in a wireless communication area that the radio waves transmitted from the access point reach can freely access the Internet. That is, this service opens the broadband network that the manager of the public space subscribes to the users who have the terminals and want to use the public space, by using the wireless LAN access point. This service enhances facility for the users connecting the Internet, and promotes wide use of the public space.

In such a free spot, there is a case that authorizes the right for connecting the Internet through the wireless LAN in a wireless communication area only to limited persons (customers, for example); in such a case, it was necessary to prevent fraudulent intrusion into the network by unauthorized persons. Since the wireless communication waves are frequently emitted between the terminals many people own and the access point in a free spot where many people gather, it was also necessary to securely prevent the radio waves from being intercepted in the wireless communication area to leak the communication contents to the third party, in order to protect the privacies of many people securely sufficiently.

In regard to the wireless LAN, various security techniques have been proposed which prevent the fraudulent intrusion into the network and the leakage of the communication contents to the third party. For example, a technique is proposed which utilizes MAC (Media Access Control) addresses being inherent identifying numbers assigned in advance to wireless LAN interfacing devices (for example, wireless LAN adapter) mounted on the terminals, registers the MAC addresses to the access point, makes the access point authenticate the MAC addresses accompanied with the accesses from the terminals, and rejects a request from a terminal requiring the access point to connect the network, if the terminal address is a MAC address other than the registered MAC addresses (hereunder, called the MAC address limitations, refer to JPA No. 320373/2001). Also, a technique is proposed which sets WEP (Wired Equivalent Privacy) keys to the terminals and the access point as the common cipher keys, enciphers the contents of data exchanged between the terminals and the access point by using the WEP keys, and if the data are leaked, makes the analysis of data contents difficult, and makes the data contents unknown (hereunder, called the WEP encryption, refer to JPA No. 345819/2001).

Therefore, in order to realize a free spot with the security established, it was necessary to perform in advance of using the free spot the registering of MAC addresses and the setting of WEP keys as to the terminals of the persons who want to use the free spot.

However, the above conventional security techniques had to perform the registering of MAC addresses to the access point and the setting of WEP keys to the terminals by manual operations, which involved complicated and troublesome works when newly adding a terminal using the wireless LAN. Especially in a free spot provided to a public space, there are a lot of people who intend to use the free spot, and the number thereof increases gradually. It was extremely inconvenient and unrealistic to impose the terminal operations relating to the registering of MAC addresses and the setting of WEP keys on such numerous terminal owners as the condition for using the free spot.

In order to set the WEP key having been set to the terminal with arbitrary character strings also to the access point, it is reasonable to set it by using a wireless LAN. That is, the terminal should transmit a radio wave with the data of the WEP key superposed toward the access point, and the access point receiving this should set the WEP key as to the concerned terminal. If this arrangement is made, the terminal owner is able to use various services (for example, connection to the Internet) through the wireless LAN immediately after the WEP key is transmitted. However, to transmit the WEP key by means of wireless in this manner involves the apprehension that the radio wave will be intercepted between the terminal and the access point, and WEP key will leak to the third party. If this becomes real, the third party acquiring the leaked WEP key becomes able to analyze all the data exchanged between the terminal with the WEP key set and the access point, and able to know the contents of the data. If this is real, the security system by encryption will collapse. Especially, the access point in the free spot performs the setting of the WEP key as to the terminals of great many people who want to use the free spot. Accordingly, it is necessary to prevent the WEP key from leaking securely sufficiently, and to keep the secrets of communication contents of great many users securely sufficiently.

Further in recent years, the wireless LAN interfacing device and the access point have been developed which meet plural cipher systems. In this case, there is intricacy of the user selecting the cipher systems as well as troublesomeness of the setting. And, in case the cipher systems have differences in the security level, if a user intends to enhance the security level of the currently used cipher system as much as possible, the user has to be reconciled to a cipher system of a lower security level because of the troublesomeness.

SUMMARY OF THE INVENTION

Accordingly, the invention has been made in view of the above problems, and intends to realize new additions of the terminals to use the wireless LAN with a simplified manner, while preventing leakage of the data indicating the cipher key, which adopts the following constructions.

In a first aspect, the cipher key setting system according to this invention is to set a cipher system and a cipher key used for enciphering prior to communication wireless communication data exchanged by wireless between a wireless LAN access point and a terminal with a wireless LAN interfacing device. The terminal includes: a cipher system transmitter on the terminal side that transmits cipher systems adaptable to the terminal by wireless to the access point, and a cipher key acquirer on the terminal side that sets the cipher keys of the cipher systems transmitted from the access point. The access point includes: a cipher key transmitter on the access point side that narrows the cipher systems among adoptable cipher systems by the adaptable cipher systems transmitted by wireless from the terminal, determines a usable cipher key in the cipher systems narrowed, and transmits the determined cipher key by wireless to the terminal, and a cipher system selector that selects a cipher system to be adopted on the basis of a security policy determined in advance among the narrowed cipher systems, and sets the selected cipher system and the determined cipher key.

In the invention thus constructed, as the terminal transmits cipher systems adaptable to the terminal by wireless to the access point, the access point narrows the cipher systems among adoptable cipher systems by the adaptable cipher systems transmitted by wireless from the terminal, determines a usable cipher key in the cipher systems narrowed, and transmits the determined cipher key by wireless to the terminal. And, the access point selects a cipher system to be adopted on the basis of a security policy determined in advance among the narrowed cipher systems, and adopts the selected cipher system and the determined cipher key.

On the other hand, the terminal sets the cipher key of the cipher system transmitted from the access point, thereafter performs wireless communications between the terminal and the access point by using the set cipher system and cipher key.

Thus, according to the invention, while the access point reflects the cipher systems adaptable to the terminal and specifies the cipher system, the cipher key setting system of the invention is made to set the cipher keys corresponding to the cipher systems each to the access point and the terminal. And, since the access point has specified the cipher system based on the security policy specified beforehand in this case, it is possible to resolve troublesomeness in the selection of the cipher systems by a user.

This security policy is not necessarily required to be a fixed one, and in the invention relating to a second aspect, the cipher key setting system is made to include a plurality of the security policies, wherein any of them are made selectable.

To prepare a plurality of the security policies in advance will allow the user some latitude in selecting the policies, and will also resolve troublesomeness when the user determines the security policy anew.

There can be a case where the cipher system is modified in registering a new terminal based on the security policy. As a preferable example in such a case, in the invention relating to a third aspect, the cipher key transmitter on the access point side transmits the cipher systems and the cipher keys in correspondence with the narrowed cipher systems each by wireless to the terminal, and the cipher key acquirer on the terminal side stores the cipher keys each in correspondence with the cipher systems each transmitted from the access point.

Thus, since the access point transmits the cipher keys for the adaptable cipher systems each in advance to the terminal side, the access point is not needed to notify and revise the cipher keys even if the access point modifies the cipher systems. This will make it possible to resolve troublesomeness in notifying the cipher keys, and at the same time to prevent the lowering of the security, accompanied with notifying the cipher keys.

When the terminal is notified of the cipher systems and the cipher keys corresponding thereto, there can be a case where the terminal is required to specify the cipher systems. As a preferable example in this case, in the invention relating to a fourth aspect, the cipher key transmitter on the access point side specifies different station IDs to a plurality of usable cipher systems each, and transmits the station IDs specified in correspondence with the narrowed cipher systems each together with the cipher keys by wireless to the terminal, and the cipher key acquirer on the terminal side acquires the station IDs from connectable access points, and when there is a coincident station ID between the above station IDs acquired from the connectable access points and the station IDs transmitted in advance by wireless from the access point and stored therein, adopts the cipher system corresponding to the coincident station ID and the cipher key.

In the invention relating to the fourth aspect thus constructed, the cipher key transmitter on the access point side specifies different station IDs to a plurality of usable cipher systems each, and transmits the station IDs specified in correspondence with the narrowed cipher systems each together with the cipher keys by wireless to the terminal.

The cipher system selector adopts the cipher system and the cipher key on the basis of the security policy determined in advance, which leads to adopting the corresponding station ID in accordance with the adoption of the cipher system.

On the other hand, the cipher key acquirer on the terminal side acquires the station IDs from the connectable access points, and judges whether there is a coincident station ID between the above station IDs acquired from the connectable access points and the station IDs transmitted in advance by wireless from the access point and stored therein. If there is a coincident station ID, it is possible to judge that the access point adopts the cipher system corresponding to the coincident station ID and the cipher key; accordingly, the terminal adopts the cipher system and the cipher key as well.

With the construction thus provided, it becomes unnecessary to perform the notification for specifying the cipher system between the access point and the terminal, thereby resolving troublesomeness of the procedure and preventing the lowering of the security.

In the invention relating to a fifth aspect, as an applied example of the above, the cipher key acquirer on the terminal side acquires the station IDs from the connectable access points anew, when it becomes impossible to maintain the communication with the access point based on the station ID specified, and when there is a coincident station ID between the above station IDs acquired anew and the station IDs having been stored therein, adopts the cipher system corresponding to the coincident station ID and the cipher key.

With the construction thus provided, if the access point modifies the cipher system according to the security policy, the access point is not required to notify the existing terminals of the modification at all, and each terminal can automatically follow up the modification of the cipher system.

As a preferable example for preventing the lowering of the security when transmitting the cipher keys and so forth by wireless, in the invention relating to a sixth aspect, the cipher key setting system includes: a communication area delimiter that narrows a wireless communication area including the access point and the terminal from a normal communication area, and a cipher key setter that, when the wireless communication area is narrowed by the communication area delimiter, sets the cipher keys by communicating cipher key data indicating the contents of the cipher keys by wireless between the terminal and the access point that exist within the wireless communication area.

When this construction is provided, it will set the cipher keys used for enciphering wireless communication data exchanged between the access point and the terminal. This setting of the cipher keys will be implemented by communicating the cipher key data indicating the contents of the cipher keys by wireless between the terminal and the access point, when the wireless communication area including the access point and the terminal is narrowed from the normal communication area.

This will make difficult interception of the wireless communication data having the cipher keys superposed, which prevents leakage of the cipher key data, since the cipher key data are exchanged in a comparably narrow area with the access point located at the center, even in case the cipher key data are communicated by wireless. Therefore, it becomes possible to simply realize new additions of the terminals that use the wireless LAN, while prevention leakage of the cipher key data, thus achieving the wireless LAN with a high security level that facilitates users' subscriptions.

As a mode for achieving the communication area delimiter, various forms can be considered. For example, the communication area delimiter can be realized on the side of the access point. In concrete, the communication area delimiter may be constructed as follows: the access point includes an instructor that instructs to start the setting of the cipher keys to the access point, and a condition determiner that determines a condition to narrow the wireless communication area from the normal communication area based on the instruction by the instructor; and the communication area delimiter narrows the wireless communication area under the condition determined by the condition determiner. If this construction is provided, when an instruction to start the setting of the cipher keys is given, the wireless communication area is narrowed under the condition determined on the basis of this instruction, and the setting of the cipher keys is carried out. Accordingly, it is not necessary to put the access point in the state of accepting the cipher keys constantly. As the instructor can be conceived a means to instruct by an operation of a device remotely controllable by wireless to the access point, such as a terminal provided with a wireless LAN interfacing device or a remote controller, in addition to a means to instruct by an operation of an operating part physically provided on the access point.

The cipher key setting system of the aforementioned invention can be understood as the whole system composed of an access point and a terminal, and the invention can be understood in each of the access point and the terminal being the components thereof.

The invention relating to a seventh aspect from this point of view describes a wireless LAN access point that adapts itself to a plurality of cipher systems in the wireless LAN communication. The access point includes, for setting a cipher system and a cipher key used in enciphering communication data prior to performing wireless communications with a terminal provided with a wireless LAN interfacing device, a cipher key transmitter that, when the adaptable cipher systems are transmitted by wireless from the terminal, narrows the cipher systems among adoptable cipher systems in the access point by the adaptable cipher systems transmitted by wireless from the terminal, determines a usable cipher key in the cipher systems narrowed, and transmits the determined cipher key by wireless to the terminal, and a cipher system selector that selects a cipher system to be adopted on the basis of a security policy determined in advance among the narrowed cipher systems, and sets the selected cipher system and the determined cipher key.

The invention relating to an eighth aspect describes a wireless LAN terminal to which is connected a wireless LAN interfacing device that adapts itself to a plurality of cipher systems in the wireless LAN communication. The wireless LAN terminal includes, for setting a cipher system and a cipher key used in enciphering communication data prior to wireless communications with a wireless LAN access point, a cipher system transmitter that transmits cipher systems adaptable to the terminal by wireless to the access point, and a cipher key acquirer that stores station IDs corresponding to the cipher systems each transmitted by wireless from the access point and the cipher keys, acquires the station IDs from connectable access points, and when there is a coincident station ID between the above station IDs acquired from the connectable access points and the station IDs having been stored, adopts the cipher system corresponding to the coincident station ID and the cipher key.

In the same manner as the invention can be understood as an invention of a device, the cipher key setting device, the invention can also be understood as an invention of a carrying-out process of the system. The invention relating to a ninth aspect from this point of view describes a cipher key setting method that sets a cipher system and a cipher key used in enciphering communication data prior to wireless communications performed by wireless between a wireless LAN access point and a terminal with a wireless LAN interfacing device. In the cipher key setting method, the terminal transmits cipher systems adaptable to the terminal by wireless to the access point; the access point narrows the cipher systems among adoptable cipher systems by the adaptable cipher systems transmitted by wireless from the terminal, determines a usable cipher key in the cipher systems narrowed, and transmits the determined cipher key by wireless to the terminal, selects a cipher system to be adopted on the basis of a security policy determined in advance among the narrowed cipher systems, and sets the selected cipher system and the determined cipher key; and the terminal sets the cipher key of the cipher system transmitted from the access point.

To each invention of the seventh aspect through the ninth aspect, it is possible to apply the same modes as those of the aspects dependent on the first aspect.

Other and further objects, features and advantages of the invention will appear more fully from the following description.

DETAILED DESCRIPTION OF THE PREFERRED EMBODIMENTS

In order to further discuss the construction and function of the present invention thus described, the preferred embodiments of the invention will be described in the following order.

A. First Embodiment (cipher key setting system LH1): Embodiment of a cipher key being fixed
    A-1. Outline of the cipher key setting system LH1
    A-2. Processing contents on the setting of the WEP key
    A-3. Functions and effects B. Second Embodiment (cipher key setting system LH2): Embodiment of cipher keys being switched C. Modified examples

A. First Embodiment

A-1. Outline of the Cipher Key Setting System LH1

Figure 1:
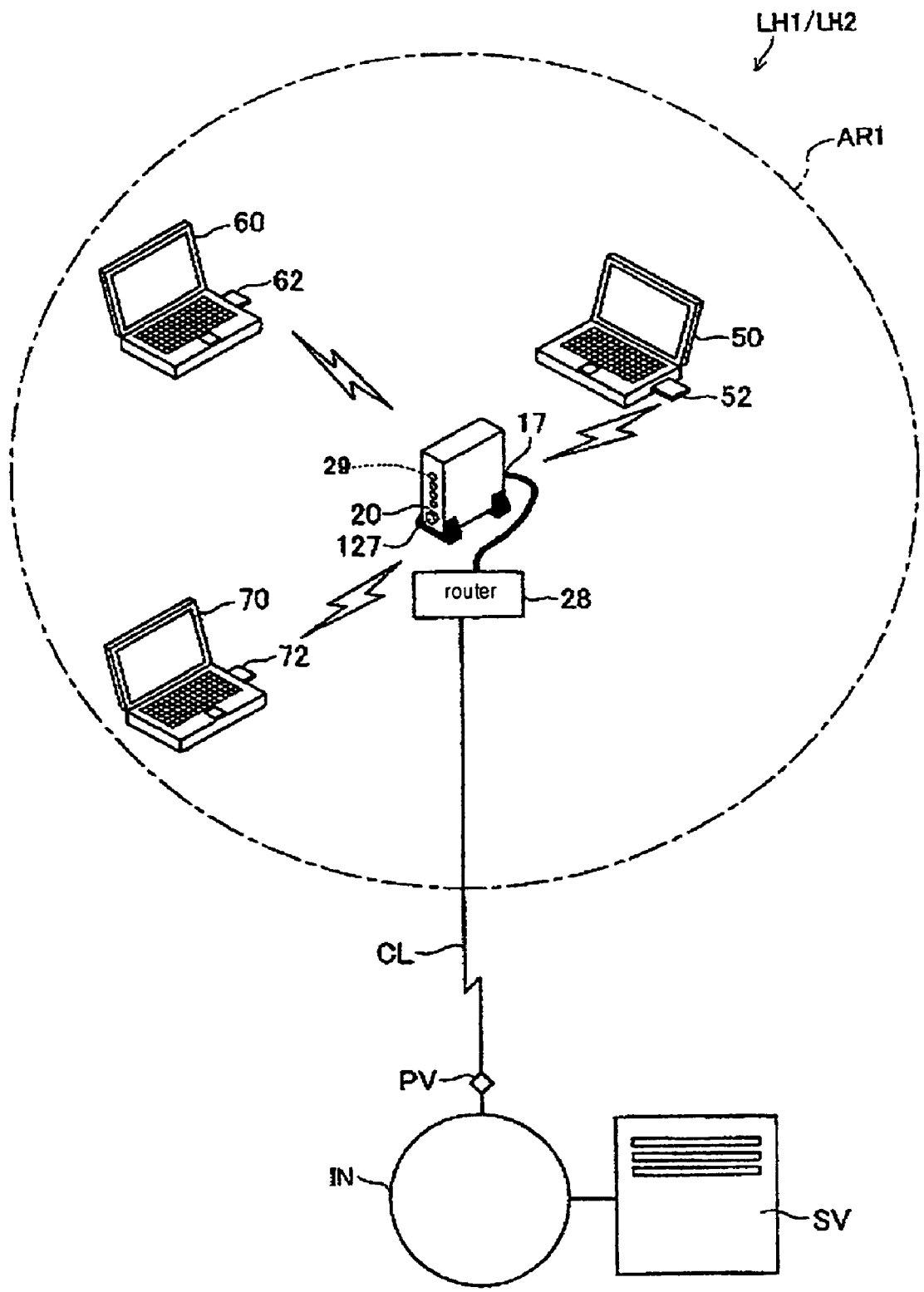
FIG. 1 illustrates a construction of hardware that implements a cipher key setting system LH1 being the first embodiment of the invention.
Figure 2:
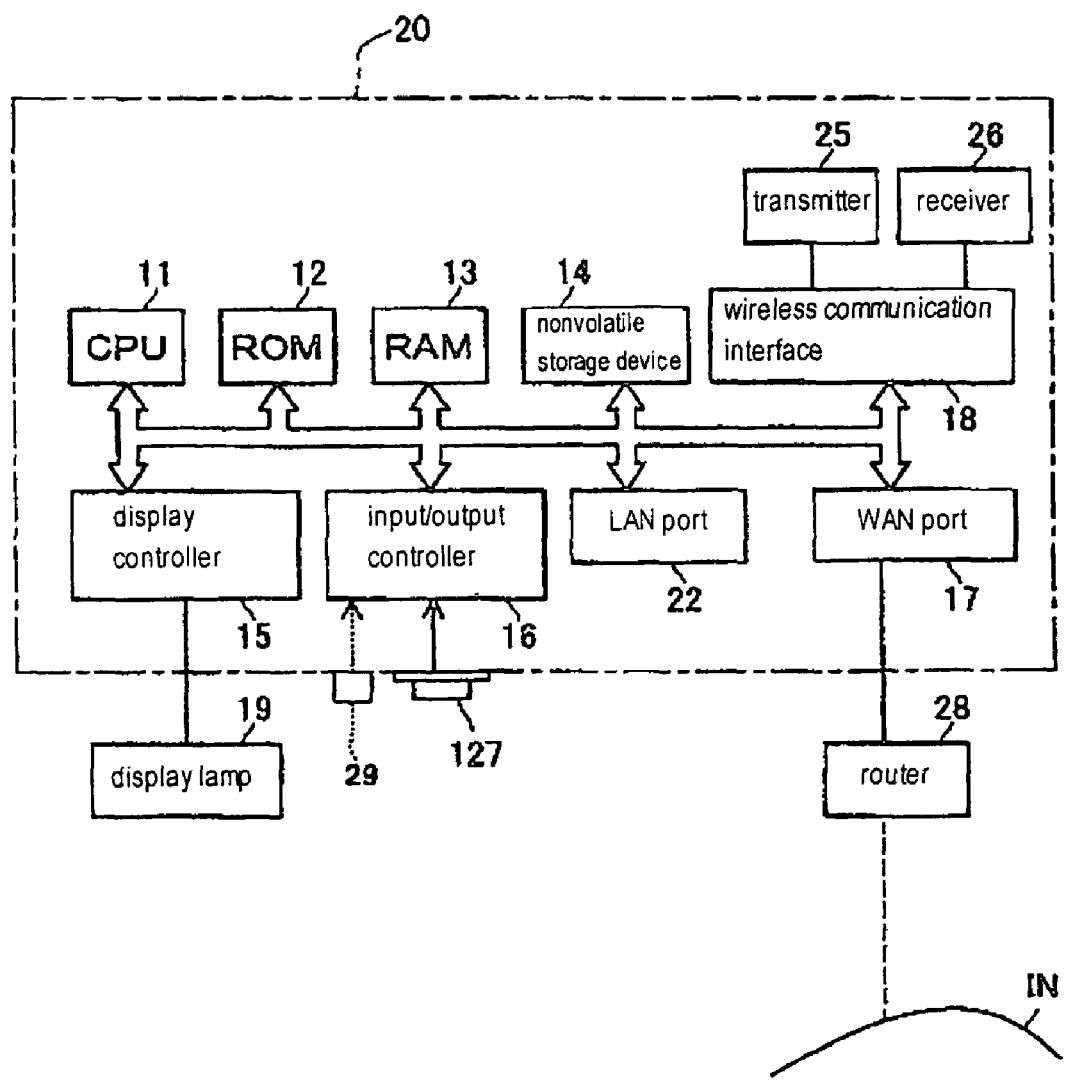
FIG. 2 illustrates a construction of an access point 20.

FIG. 1 illustrates a construction of hardware that implements the cipher key setting system LH1 being the first embodiment of the invention. FIG. 2 illustrates a construction of an access point 20. The first embodiment relates a case of a cipher key being fixed, and the second embodiment relates a case of plural cipher keys being switched.

The cipher key setting system LH1 performs a wireless communication between a terminal 50 and the access point 20 in a wireless LAN communication area AR1, in which the key data representing the contents of a WEP key as the cipher key are superposed on a radio wave; and thereby, the system sets the WEP key that the access point 20 uses to the terminal 50.

As shown in FIG. 1, in the wireless communication area AR1 is installed the wireless LAN access point 20 (wireless base station). The access point 20 includes, as shown in FIG. 2, a CPU 11, a ROM 12 mutually connected with the CPU 11 through a bus, a RAM 13, a nonvolatile storage device 14 such as a hard disk, a WAN port 17 as the network interface, a LAN port 22 for connecting with a wired LAN, a wireless communication interface 18, a display controller 15, and an input/output controller 16 and so forth.

The ROM 12 contains various programs relating to the communications with the terminals 50, 60, and 70 in the wireless communication area AR1, various programs relating to the connections with the Internet IN, and various data necessary for executing these programs. The input/output controller 16 has a push-type register button 127 connected. The register button 127 is mounted on the access point 20 in a manner that the pressed part thereof is exposed on the enclosure surface of the access point 20. To the display controller 15 are connected various display lamps 19 that display the connection state and the communication state with the wireless LAN by means of lighting and/or flashing, or the other means.

To the wireless communication interface 18 are connected a transmitter 25 for transmitting a radio wave and a receiver 26 for receiving radio waves. The access point 20 incorporates the transmitter 25 and the receiver 26 in a state that the transmitter 25 can transmit the radio wave and the receiver can receive the radio waves from the outside. The wireless communication area AR1 illustrated in FIG. 1 represents the range that, when the output of the transmitter 25 and the reception sensitivity of the receiver 26 are set to the standard setting values, the radio wave transmitted from the transmitter 25 can reach and the receiver 26 can receive the radio waves from the terminals 50, 60, and 70. By installing the access point 20 with this construction, a wireless LAN will be structured such that it has the wireless communication area AR1 as the normal communication range.

The ROM 12 stores in advance an output-modifying program that describes a temporarily modifying processing of the output standard setting value for the transmitter 25, and a reception-sensitivity-modifying program that describes a temporarily modifying processing of the reception sensitivity standard setting value for the receiver 26, as the programs for communicating with the terminals 50, 60, and 70. The processing for modifying the setting values are performed by arithmetic processing that multiply the standard setting values by $1/n$ (n: a predetermined constant). The CPU 11 executes the output-modifying program and the reception-sensitivity-modifying program, and outputs a modified output value and a modified reception sensitivity value through the wireless communication interface 18 to the transmitter 25 and the receiver 26. Thereby, the transmitter 25 transmits the radio wave at the modified output level, and the receiver 26 receives the radio wave with the modified reception sensitivity.

The terminals 50, 60, and 70 are the well-known note-type personal computer, which includes the control device composed of a CPU, ROM, RAM, etc., and a hard disk drive and a CD-ROM drive as the storage device. Naturally, they may be the mobile information terminal (Personal Digital Assistant) or the other terminal.

The terminals 50, 60, and 70 have wireless LAN adapters 52, 62, and 72 mounted thereon as the wireless LAN interfacing device, which enables the transmissions and receptions of the radio waves between the access point 20 and these terminals. To incorporate the device driver for the wireless LAN adapters 52, 62, and 72 into the terminal 50 will make it possible for the terminals 50, 60, and 70 to recognize and control the mounted wireless LAN adapters 52, 62, and 72. Here, the wireless LAN adapters 52, 62, and 72 have MAC addresses assigned thereto, which are identification numbers inherent in the adapters.

The wireless LAN adapters 52, 62, and 72 perform the transmissions and receptions of radio waves with the access point 20 in the wireless communication area AR1, and thereby the terminals 50, 60, and 70 communicate by wireless with the access point 20. The access point 20 and the wireless LAN adapters 52, 62, and 72 are capable of converting the format of exchange data into the format suitable for communication, the so-called packet format. Thereby, the off-line data exchange (in a state that the system LH1 is not connected to the Internet) becomes possible in theory between the terminals 50, 60, and 70 and the access point 20.

Next, the access point 20 is connected to the Internet IN, and the construction for this connection will be described. As shown in FIG. 1, a router 28 incorporating a modem is connected through a cable to the WAN port 17 of the access point 20. The router 28 is capable of specifying and discriminating the terminals 50, 60, and 70 in the wireless LAN, on the basis of the MAC addresses of the wireless LAN adapters 52, 62, and 72 each.

The modem contained in the router 28 is connected to the Internet through a broadband communication line CL such as a CATV line and xDSL line, and a provider dedicated line PV. That is, the router 28 functions as a gateway connecting the wireless LAN to the Internet.

This embodiment permits the connection to the wireless LAN to the terminals of which MAC addresses are registered to the access point 20 (hereunder, called registered terminal) among the multiple terminals with the wireless LAN adapters, which are owned by persons present in the wireless communication area AR1. The owners of the registered terminal are able to connect the own terminals to the Internet IN through the access point 20, and to acquire various types of information such as the web contents stored in the server SV on the Internet IN. On the other hand, the terminals of which MAC addresses are not registered to the access point 20 (hereunder, called non-registered terminal) cannot be connected to the wireless LAN even if they are present in the wireless communication area AR1. That is, the wireless communication area AR1 is the free spot where the connection service to the Internet IN is provided only to the owners of the registered terminal. Here in FIG. 1, the terminals 50 and 60 are assumed as the registered terminal, and the terminal 70 is assumed as the non-registered terminal.

The data including various contents such as contracts and services (hereunder, called content-bearing data) which are superposed on the radio waves are transmitted and received between these registered terminals and the access point 20. This embodiment assumes that the device (registered terminals, access point 20) for transmitting the content-bearing data enciphers the content-bearing data in advance of transmission with the cipher key of the already mentioned WEP key, and transmits enciphered content-bearing data (hereunder, called enciphered data) to the receiving device (access point 20, registered terminals). The receiving device deciphers the received enciphered data with the WEP key, and acquires the content-bearing data.

The WEP is the cryptographic technique of a secret key cryptography (both the enciphering side of data and the deciphering side of enciphered data use the same cipher key) used in the IEEE 802.11, which uses the 64-bits or 128-bits WEP key as the cipher key.

The cryptographic technique using the WEP key makes the analysis of the content-bearing data difficult, when the radio waves with the content-bearing data superposed are intercepted in the wireless communication area AR1, which prevents the communication contents from leaking to the third party. As an example, when a registered terminal transmits a contract document including a credit card number to the access point 20, it is possible to prevent the credit card number from leaking to the third party through the interception of the radio waves.

A-2. Processing Contents on the Setting of the WEP Key

Next, the method of setting the WEP key to the terminals 50 and 60 will be described.

The ROM 12 of the access point 20 stores in advance the program for registering the MAC addresses of the wireless LAN adapters 52 and 62 (MAC register program), as the program for communicating with the terminals 50 and 60. On the other hand, the utility program installed in the terminals 50 and 60 when using the wireless LAN contains the program for setting the WEE key (WEP key setting program).

Figure 3:
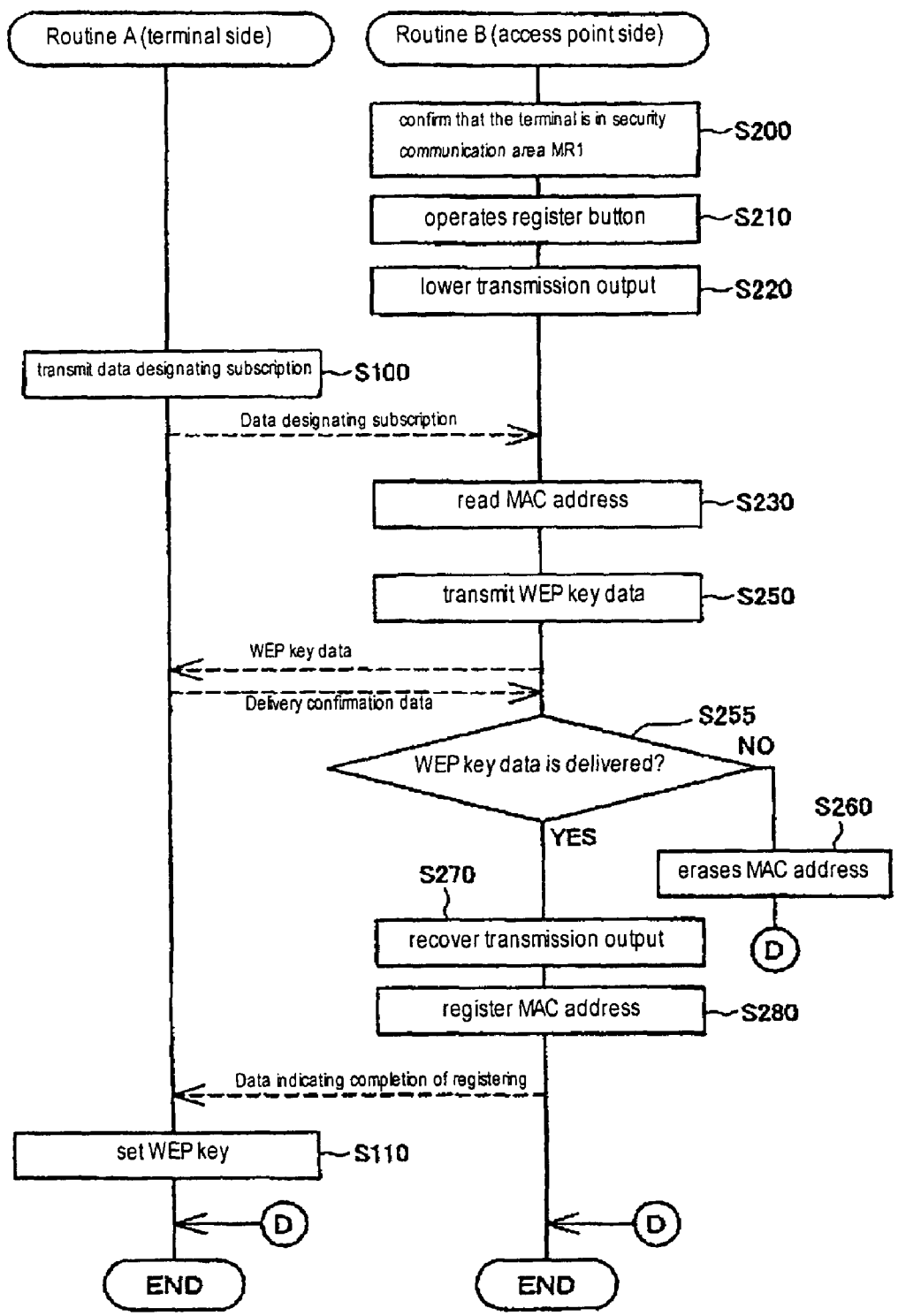
FIG. 3 is a flow chart illustrating a security data setting processing routine.

The CPUs of the terminals 50 and 60 execute the contents of the WEP key setting program. Accompanied with the executions of the WEP key setting program, the CPU 11 of the access point 20 executes the contents of the MAC register program and the output-modifying program. Thereby, the security data setting processing is performed, as shown in FIG. 3. As the security data setting processing is performed, the MAC addresses of the wireless LAN adapters 52 and 62 are registered to the access point 20, and the WEP key common to the access point 20 and the terminals 50, 60 is set.

Figure 4:
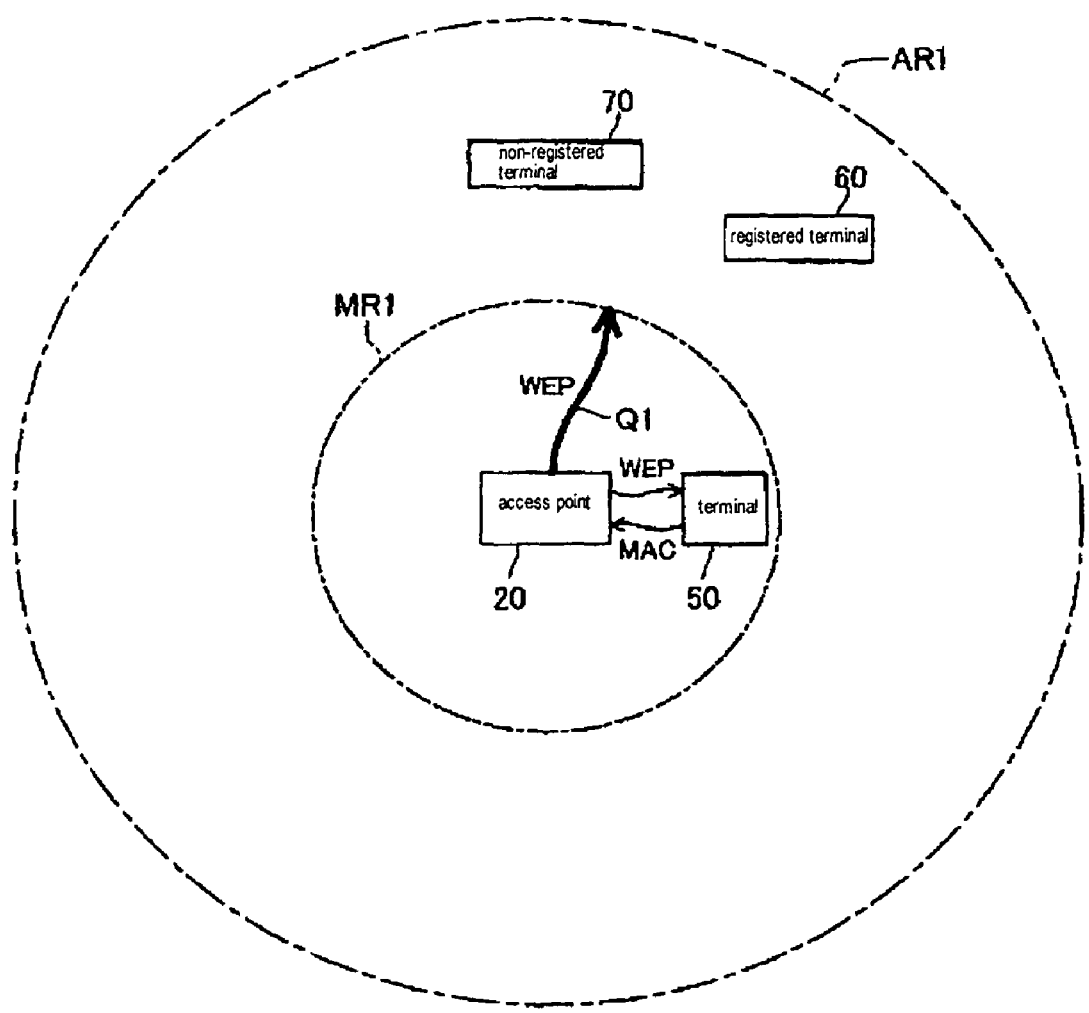
FIG. 4 illustrates an attainable range of radio waves by a transmitter 25 after modifying the output value as a security communication area MR1.

The contents of the security data setting processing will be described with FIG. 3 and FIG. 4. FIG. 3 is a flow chart illustrating the security data setting processing routine. FIG. 4 illustrates an attainable range of the radio waves by the transmitter 25 after modifying the output value, as a security communication area MR1. The descriptions hereunder on FIG. 3 and FIG. 4 assume that the object to which the MAC address is registered, or the object to which the WEP key is set is the terminal 50.

The security data setting processing routine includes a routine A that the CPU of the terminal 50 executes, and a routine B that the CPU 11 of the access point 20 executes. Prior to registering this routine, the manager of the access point 20 confirms that the terminal 50 exists in the security communication area MR1, and operates the register button 127 (step S200, S210). The security communication area MR1 shows the attainable range of the radio waves by the transmitter 25, when the standard output setting value is temporarily lowered through the execution of the output-modifying program (refer to FIG. 4). By the operation of the register button 127, the access point 20 switches the operation mode from the normal mode into the register mode, executes the output-modifying program, and executes the processing for lowering the output value of the transmitter 25 to 1/n of the standard setting value (step 220). Thereby, the range within which the transmitter 25 can transmit the radio wave is reduced to the security communication area MR1, which is narrower than the wireless communication area AR1. Therefore, if a registered terminal exists in the wireless communication area AR1, but if it dose not exist in the security communication area MR1, the registered terminal will not be able to access the access point 20.

Next, the terminal 50 specifies the MAC address of the wireless LAN adapter 52, and executes the processing of transmitting packets to the access point 20 (step S100). Here, the packets include data indicting subscription to the wireless LAN (hereunder, called subscription indication), and the MAC address added to the data as the header information.

Following this, the access point 20 reads the MAC address from the header information on the received packets, and temporarily stores the read MAC address in a buffer area of the RAM 13 (step S230).

Then, the access point 20 transmits the data indicating the WEP key to be used (hereunder, called WEP key data) to the terminal 50 (step S250), and judges whether or not the WEP key data is delivered to the terminal 50 (step S255). This judgment as to being delivered or not can be made by using the data return function of the wireless LAN adapter 52. If the access point 20 judges that the WEP key data is not delivered to the terminal 50, the access point 20 erases the MAC address stored in the RAM 13 (step S260), and terminates this routine.

On the other hand, if the access point 20 judges that the WEP key data is delivered to the terminal 50, the access point 20 executes the output-modifying program, and returns the output value of the transmitter 25 to the standard setting value (step S270). Thereby, the attainable range of the radio wave by the transmitter 25 is increased to the normal range (wireless communication area AR1); and, if it exists in the wireless communication area AR1, the registered terminal is able to access the access point 20.

Following this, the access point 20 registers the MAC address of the terminal 50 to the management domain of the storage device 14 (step S280), and returns the operation mode to the normal mode to terminate this routine. Up to this step, the access point 20 completes the processing of registering the MAC address of the terminal 50.

On the other hand, having received the WEP key data through the processing of step S250, the terminal 50 executes the automatic setting processing of associating the WEP key with the IP address of the access point 20 (step S110), and terminates this routine. Thereat, the terminal 50 completes the processing of setting the WEP key of the access point 20. Thereafter, the terminal 50 and the access point 20 transmit and receive enciphered data in which the content-bearing data are enciphered with the set WEP key.

A-3. Functions and Effects

The cipher key setting system LH1 of the first embodiment thus described automatically sets the WEP key to the terminal 50, through executing the setting processing of the security data. This automatic setting of the WEP key through the wireless communication facilitates a new addition of the terminal 50 that intends to use the wireless LAN, promotes a new participation in the wireless LAN. For setting the WEP key, the owner of the terminal 50 and the manager of the access point 20 do not need to connect the terminal 50 and the access point 20 with cables, and do not need to create and set the WEP key by manual operations either. It is extremely recommendable to apply the cipher key setting system LH1 to the wireless LAN installed in the free spot. The wireless LAN in the free spot will increasingly collect many people who intend to utilize the wireless LAN; and thereat, this system is capable of remarkably reducing troublesome manual operations accompanied with the settings of new subscribers.

When transmitting the radio wave with the WEP key data superposed to the terminal 50, the access point 20 modifies the attainable range of the radio wave transmitted from the access point 20 from the normal range shown by the wireless communication area AR1 into the narrower range shown by the security communication area MR1. This modification of the attainable range of the radio wave will accordingly lower the possibility that the radio wave with the WEP key data superposed is intercepted. In FIG. 4 as an example, when the access point 20 transmits the WEP key data to the terminal 50, the radio wave with the WEP key data superposed can reach only the range within the security communication area MR1 (refer to the arrow Q1), and the radio wave will not be received by the registered terminal 60 and the non-registered terminal 70 that exist outside the security communication area MR1. Therefore, although the WEP key data are transmitted by wireless, this system will securely prevent the leakage of the WEP key, and will realize the wireless LAN with a high security level. Especially in case the access point 20 is installed in a free spot, the WEP keys are securely prevented from being leaked to the third party during setting the WEP keys to the terminals of many people who want to use the free spot.

In the cipher key setting system LH1 of the first embodiment, receiving the data indicting subscription from the terminal 50, the access point 20 temporarily narrows the communication range, creates a WEP key, transmits the created WEP key to the terminal 50, and thereafter restores the communication range. Therefore, the owner of the terminal 50 is able to set the WEP key without touching the access point 20, which is very simple and convenient.

In the cipher key setting system LH1 of the first embodiment, the access point 20 registers the MAC address of the terminal 50 accompanied with the setting of the WEP key, and permits only the registered terminals 50 and 60 to connect themselves to the wireless LAN. Thereby, it is possible to simply prevent the connection to the wireless LAN by the non-registered terminal 70. It is also possible to prevent the non-registered terminal 70 from intruding on the registered terminals 50, 60 and the access point 20 to acquire various data such as the WEP key data In the first embodiment, as the time interval of narrowing the communication range, the following can be considered: (a) interval through which the register button 127 is pressed, (b) interval from when the register button 127 is pressed until the MAC address and the WEP key are registered, (c) interval from when the register button 127 is pressed until it is pressed once again.

The first embodiment uses the register button 127 mounted physically on the access point 20 as a means for narrowing the communication range. However, it is possible to realize the 'instructor' in the Claims by a form other than the register button 127, and to narrow the communication range.

Figure 5A:
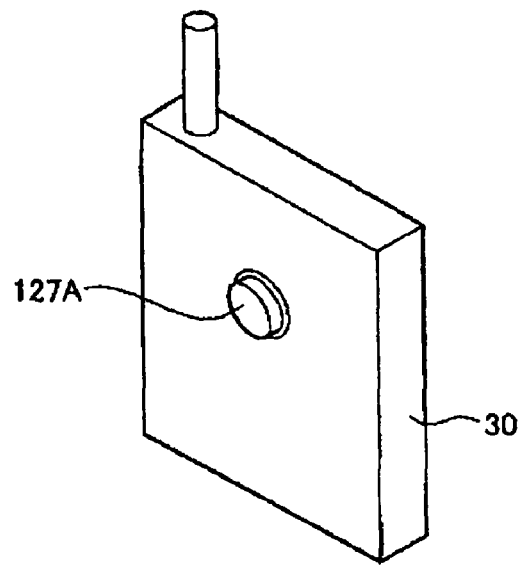
FIG. 5 illustrates another mode for instructing to modify the operation mode.
Figure 5B:
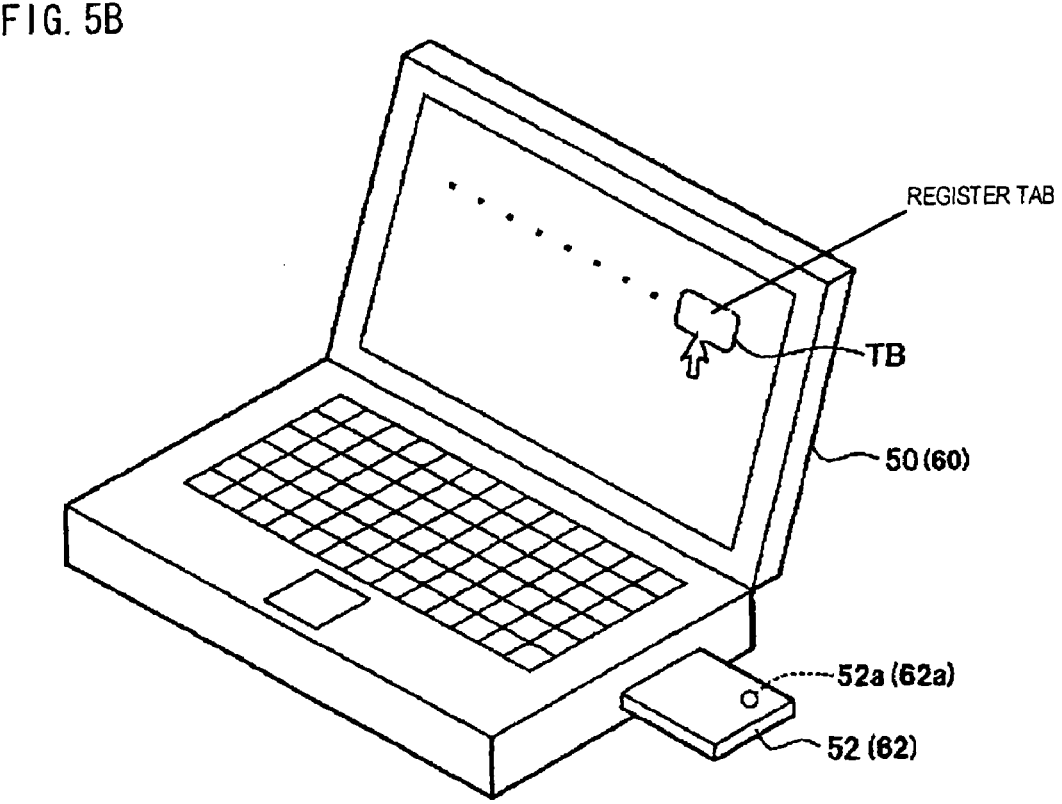

In concrete, when the access point 20 receives specific data from a predetermined device, the construction can be considered which modifies the operation mode into the register mode to narrow the communication range. As the predetermined device, the following can be considered: a remote controller 30 with a register button 127A attached, as shown in FIG. 5A, and a terminal provided with a wireless LAN interfacing device, such as the terminal 50. The specific data may be transmitted from the device by a touch operation on the button or key provided with the device (for example, a pressing operation on the register button 127A shown in FIG. 5A), or a selection operation on the display screen provided with the device (for example, a click operation on a register tab TB on the display screen of the terminal 50 shown in FIG. 5B). Here, assuming that the predetermined device is the terminal 50 with the wireless LAN adapter 52 mounted, the operation mode may be modified into the register mode in the first embodiment, when the access point 20 receives the data designating subscription from the terminal 50. In this case, it is possible to determine that the terminal 50 exists in the security communication area MR1, within the response time of communication.

According to this construction, the owners of the terminals and the manager of the access point are able to perform the settings of the WEP keys without touching the switch on the access point, which enhances the degree-of-freedom of location as to where the access point should be installed. If the access point is installed in a place where people can hardly reach (for example, on the ceiling of a shop), the setting of the WEP key can smoothly be performed between the access point and the terminals.

B. Second Embodiment

Cipher Key Setting System LH2

The first embodiment adopts the enciphering and deciphering system using the 64-bits or 128-bits WEP key, and fixes this system.

However, the enciphering and deciphering technique (hereunder, simply called cipher system) has developed the new systems, and the following are used at present.

1. WEP 64

2. WEP 128

3. TKIP

4. AES

Generally, the security level of these cipher systems is regarded to heighten according to the listed order. And, the descriptions hereunder follow this view.

However, the general wireless LAN device is not necessarily adapted to all the cipher systems. The present situation requires a user to select the cipher system, and to set the key data indicating the contents of the cipher key. In the second embodiment, the user decides a security policy, and sets or switches the cipher system and the cipher key based on the security polity.

In regard to the differences of the hardware devices and software described in the first embodiment and the hardware devices and software in the second embodiment, the outline thereof will be explained.

In the second embodiment, the wireless LAN adapter 52 is adapted to the WEP 64, WEP 128, and TKIP; and the wireless LAN adapter 62 is adapted to the WEP 64 and WEP 128.

The ROM 12 of the access point 20 stores the MAC register program of the wireless LAN adapters 52 and 62 and the cipher system selection program as well. On the other hand, the utility program installed in the terminals 50 and 60 contains the cipher key setting program concerning the setting of the cipher system. In the following flowcharts, the side of the terminals 50, 60 is shown as STA, and the side of the access point 20 is shown as AP.

The access point 20, wireless LAN adapter 52, and wireless LAN adapter 62 are provided with one-touch register buttons 29, 52*a*, and 62*a*, respectively. These buttons are made up with hardware switches, and the software is made capable of discriminating the pressed-down condition of these buttons through the interface.

The processing of registering the terminal 50 first, and then registering the terminal 60 will be now described.

Figure 6:
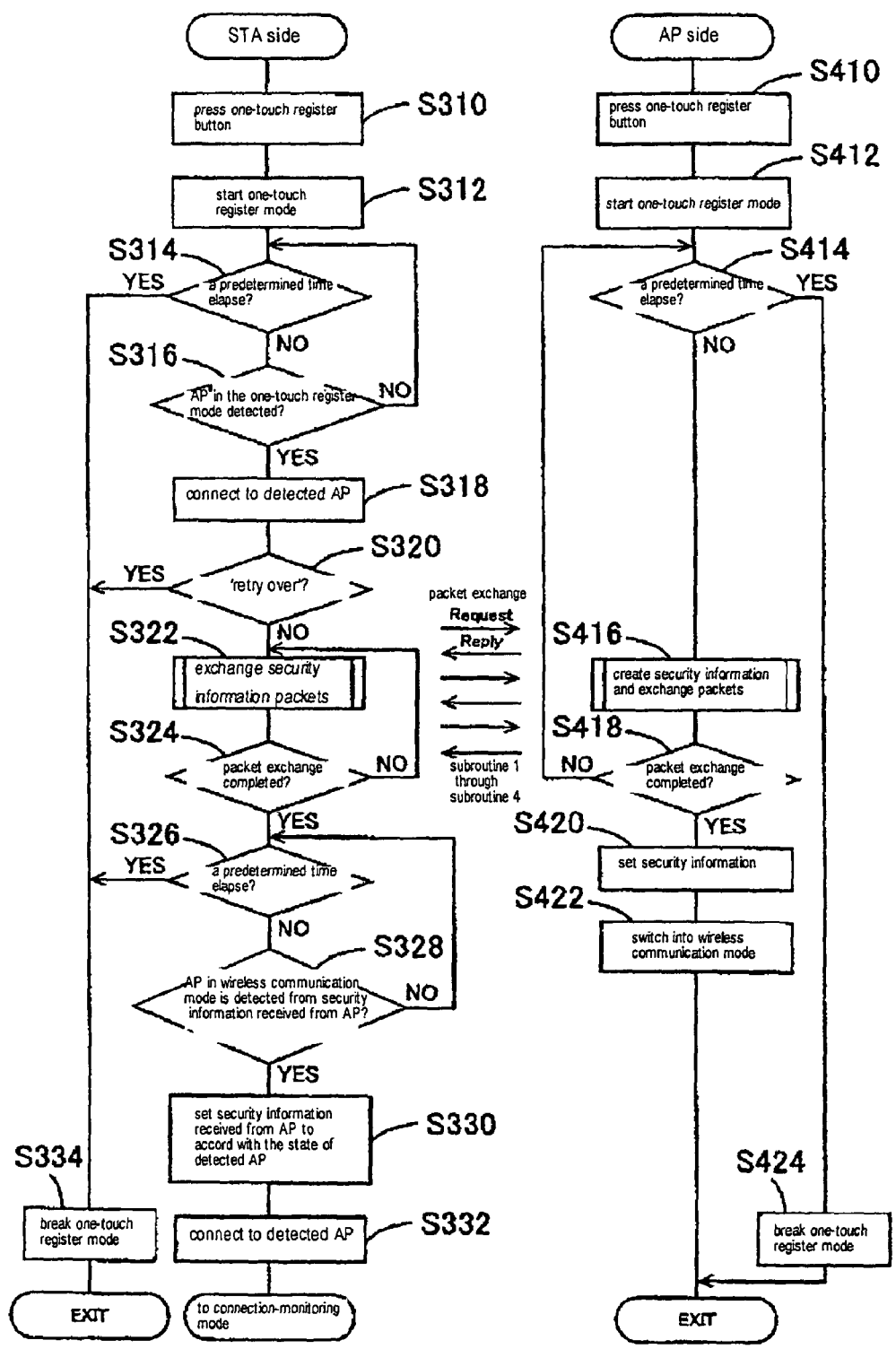
FIG. 6 is a flow chart illustrating one touch registering process in a cipher key setting system LH2 being the second embodiment of the invention.
Figure 7:
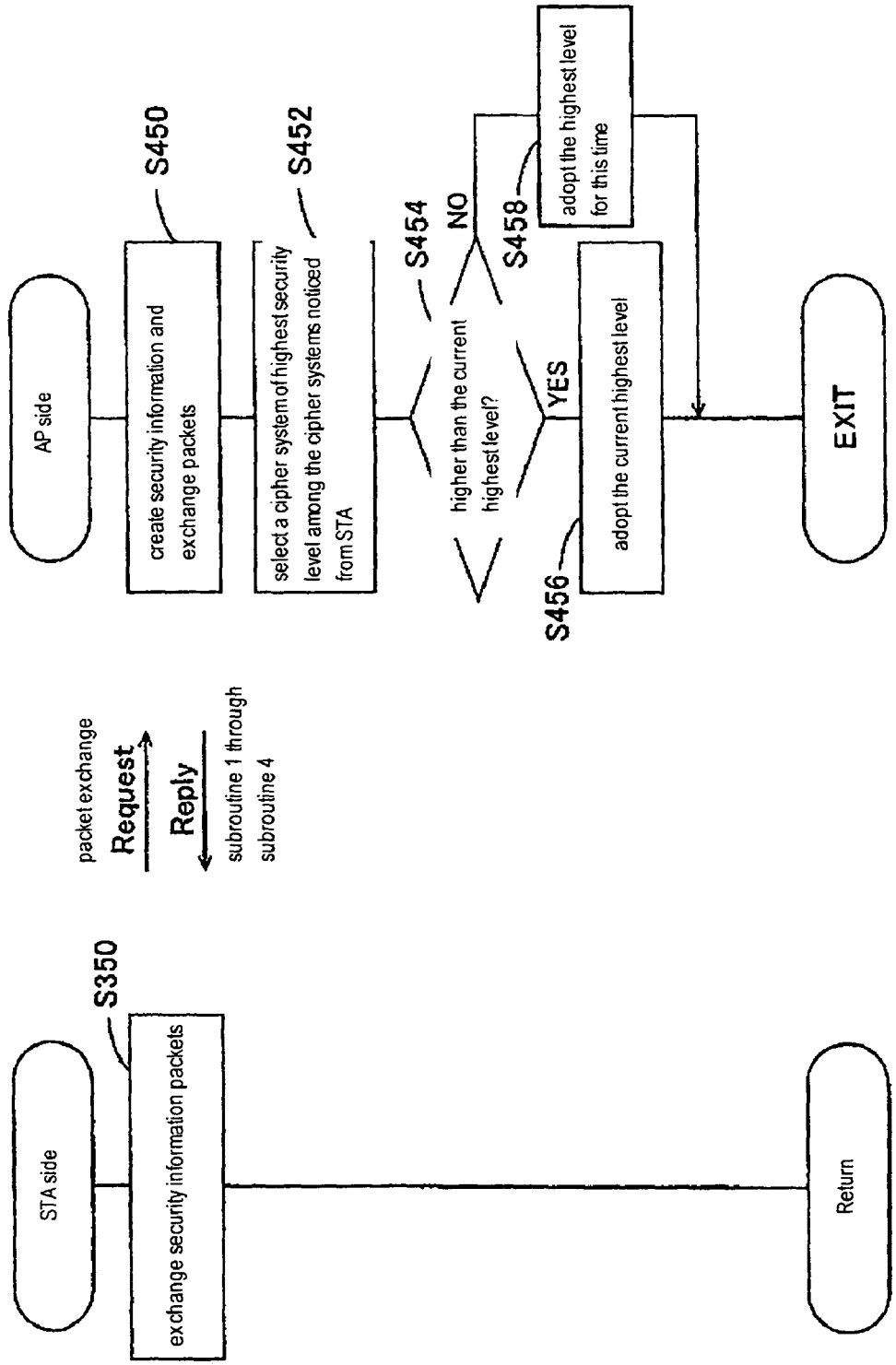
FIG. 7 is a flow chart illustrating a process of packet switching and a process of determining a cipher system.

FIG. 6 and FIG. 7 are the flow charts corresponding to the cipher system selection program and the cipher key setting program that the access point 20 and the terminals 50, 60 execute. Here, the access point 20 also executes the MAC register program in parallel to the cipher system selection processing, however the contents thereof is substantially the same as the first embodiment, and the description thereof will be omitted. That is, the second embodiment is based on the first embodiment, and includes new components added on the first embodiment.

The access point 20, terminal 50, and terminal 60 are turned into the one-touch register mode by the pressing-down operation on the one-touch register buttons 29, 52*a*, and 62*a*; and they start the respective processing. That is, on the side of the terminal 50, when detecting the pressed-down state of the one-touch button 52*a* at step S310 as shown in FIG. 6, the terminal 50 starts to execute the processing of step S312 thereafter. On the side of the access point 20, when detecting the pressed-down state of the one-touch button 29 at step S410, the access point 20 starts the one-touch register mode of step 412 thereafter.

The terminal 50, being turned into the one-touch register mode, searches the access point 20 that is in the one-touch register mode at step S316. Concretely, the access point 20, being turned into the one-touch register mode, modifies the station ID (ESSID) into a specified station ID determined in advance, and transmits a beacon. The terminal 50 tries connecting to the access point with the specified ESSID. The terminal 50 searches connectable access points, acquires the status of the connectable access points, and judges whether the mode is the one-touch register mode or not on the basis of the status.

The processing time for searching the access point 20 being in the one-touch register mode is limited to a predetermined period of time by the processing at step S314. When the predetermined time elapses without finding out the access point 20, the processing moves to step S334, and terminates the execution of the one-touch register mode.

If it searches the access point 20 being in the one-touch register mode within the predetermined time, the terminal 50 tries the connection to the detected access point 20 at step S318. The processing at step S320 is to prevent unnecessary increase in the number of times of such connection trials; and if the frequency of the connection trials exceeds a predetermined one, the processing judges it as 'retry over'. Then, the processing moves to step S334, and terminates the execution of the one-touch register mode.

As the terminal 50 succeeds in the connection without the 'retry over', the terminal 50 exchanges security information packets with the access point 20 at step S322. To correspond with this, the access point 20 executes the packet exchange processing while creating the security information at step S416. This processing is illustrated in FIG. 7, as step S350, and step 450 and thereafter.

The concrete contents of the packet exchange processing are as follows.

Subroutine 1:

The terminal 50 sends a request for creating the security information to the access point 20.

Subroutine 2:

The access point 20 sends a reply that indicates receiving the request to the terminal 50. Here, the access point 20 determines the value of the ESSID and the cipher key to each of the cipher systems that the access point 20 adapts itself to, when receiving the request for creating the security information for the first time. As an example, the access point 20 sets 'ESSID1' and 'DATA1' to the cipher system WEP 64, sets 'ESSID2' and 'DATA2' to the cipher system WEP 128, sets 'ESSID3' and 'DATA3' to the cipher system TKIP, and sets 'ESSID4' and 'DATA4' to the cipher systemAES. The 'ESSID1' through 'ESSID4' are the station IDs that are determined at random on the basis of the random number or the like, and the 'DATA1' through 'DATA4' are the values determined at random in view of association with each of the cipher systems.

Subroutine 3:

The terminal 50 sends to the access point 20 the data indicating the cipher systems that the terminal 50 adapts itself to. In this case, the wireless LAN adapter 52 mounted on the terminal 50 adapts itself to the WEP 64, WEP 128, and TKIP, and the terminal 50 sends the data indicating these three cipher systems.

Subroutine 4:

The access point 20 is capable of detecting the cipher systems adaptable to the terminal 50 on the basis of the received data. Accordingly, the access point 20 narrows its own adaptable cipher systems from the detected cipher systems. In concrete, the cipher systems of the terminal 50 are narrowed down to the WEP 64, WEP 128, and TKIP. And, the access point 20 sends to the terminal 50 the data indicating the values of the ESSID and the cipher key already determined to each of the cipher systems. Concretely, the access point 20 sends 'ESSID1' and 'DATA1' associated with the cipher system WEP 64, 'ESSID2' and 'DATA2' associated with the cipher system WEP 128, and 'ESSID3' and 'DATA3' associated with the cipher system TKIP.

The above is the packet exchange processing of security information at step S350 and at step S450 between the terminal 50 and the access point 20. Here, the packet exchange processing is made on the communication between the two parties by specifying and enciphering the MAC addresses of the other parties. In concrete, the terminal 50 creates the seed (Init ID) for the enciphering, and sends it together with the above request. Thereafter, both the access point 20 and the terminal 50 perform the enciphering and deciphering using the VAN function based on this Init ID for data communications.

After the packet exchange processing of security information, at step S452, the access point 20 selects the cipher system of the highest security level among the cipher systems noticed from the terminal 50. Among the noticed cipher systems WEP 64, WEP 128, and TKIP, the TKIP is of the highest security level, and the access point 20 selects this as a tentative candidate.

At step S454, the access point 20 compares the candidate selected at step S452 and the cipher system of the current highest level. Here, the cipher system of the current highest level means the cipher system of the highest security level, among the cipher systems that the access point 20 adapts itself to and the terminal 50 narrows based on its own adaptable cipher systems.

When performing the packet exchange processing of security level with the terminal 50 for the first time, the cipher system noticed from the terminal 50 is of the highest security level, and the cipher systems of both coincide. However, as the terminals are added thereafter, since the cipher systems are narrowed based on the cipher systems that the terminals registered in the past can adapt themselves to, the cipher systems of both are not necessarily coincident.

If the judgment at step S454 is YES (higher than the current highest level), the access point 20 maintains the current highest level; and if it is NO (lower than or equal to the current higher level), the access point 20 adopts the cipher system selected at step S452, being the highest level for this time. Therefore, the packet exchange with the terminal 50 results in the above judgment of both being 'equal', and the access point 20 adopts the cipher system 'being the highest level for this time', which is the TKIP.

The above branch processing shows the 'user security policy' of this invention. Here, the security polity represents the guideline that, when contrasting the cipher systems to which the access point can adapt itself and the cipher systems to which the terminal can adapt itself, specifies which one of the cipher systems should be adopted.

The above branch processing shows, when the security level to which a newly added terminal can adapt itself is not higher than the security level up to that moment, the security policy 'to make the same terminal participate in the network by lowering the security level' (hereunder, called policy 1). Here, if the level is judged as equal, the processing when it is judged as 'not higher' is performed. However in consequence, it is the same as the processing at step S454, 'adopting the current highest level'.

In contrast, it is possible to make the security policy that determines the lowest security level in advance, and does not make the security level lower than the predetermined lowest security level (hereunder, called policy 2). In this case, the subroutine is needed to add the judgment 'is it higher than or equal to the lowest security level?' as step S451 after step S452, to advance to step S452 and thereafter if the judgment is YES, and to advance to step S456 if it is NO.

In order to prepare the security policy that heightens the security level to the highest security level of a new terminal in consideration for a special application (hereunder, called policy 3), the subroutine is needed to execute the processing 'adapt the highest level for this time' in replacement for the processing 'adapt the current highest level.

Thus on occasion for registering a new terminal, the subroutine prepares the branch processing so as to reflect the selection of the security policies by a user in advance; thereby, it becomes possible not only to resolve the troublesomeness of setting individual cipher keys, but also to continuously reflect the security policy that the user selects.

To implement this selection, the setting program of the access point 20 displays the policies 1 through 3 on the screen, makes the user select one by using the mouse or the like, and writes the selected result in a register or the like. The access point 20 reads the contents of the register in a practical processing, and performs the branch processing that reflects the written contents. Naturally, an arrangement may be made which provides the access point 20 with hardware switches such as DIP-switches, and selects the security policy through the switching operation thereof.

The above processing including the subroutines completes the packet exchange processing of security information on the side of the access point 20.

Returning to FIG. 6, the access point 20 judges whether the packet exchange is completed at step S418, and sets the determined security information at step S420, excluding the case that the predetermined period of time is judged to have elapsed at step S414.

In other words, while adopting the cipher system determined at steps S456 and S458, the access point 20 will apply the values of the station ID and the cipher key corresponding to the same cipher system to the ciphering and deciphering processing thereafter.

Since the TKIP is adopted in the packet exchange processing with the terminal 50, the access point 20 will apply the 'ESSID3' to the station ID, and the 'DATA3' to the cipher key of the TKIP.

Thereafter, the access point 20 completes the one-touch register mode at step S422, and switches the mode into the normal wireless communication mode. When the predetermined period of time elapsed during the packet exchange processing, the one-touch register mode is also completed at step S424; however, since the registering is not completed, the mode will not be switched into the wireless communication mode.

The access point 20 will not notify the determined cipher system to the terminal 50 and so forth in this manner.

The terminal 50 on the other side searches the access point 20 in the wireless communication mode among the security information received from the access point 20 at step S328. The security information received from the access point 20 are 'ESSID1' and 'DATA1' associated with the cipher system WEP 64, 'ESSID2' and 'DATA2' associated with the cipher system WEP 128, and 'ESSID3' and 'DATA3' associated with the cipher system TKIP.

The terminal 50 acquires the station ID of an accessible access point first. The procedure for acquiring the station ID is executed on the basis of the communication standard IEEE802.11. By receiving the beacon from the access point, the terminal 50 can acquire the station ID of the currently accessible access point. Since the access point 20 adopts the TKIP as the cipher system, the station ID thereof is 'ESSID3'. Accordingly, the terminal 50 acquires the station ID 'ESSID3' based on the beacon from the access point 20, and contrasts the station ID with the security information already received. That the station ID is 'ESSID3' consequently specifies that the cipher system is the TKIP. And, to use 'DATA3' as the cipher key will realize the enciphering and deciphering.

The terminal 50 sets the security information received from the access point to accord with the state of the detected access point at step S330. The terminal 50 will thus use the cipher system and cipher key corresponding to the detected station ID in the future enciphering and deciphering. The terminal 50 connects itself to the detected access point 20, and thereafter starts the connection-monitoring mode described later.

If the terminal 50 cannot detect the access point 20 within the predetermined time at step S328, the processing advances to step S334 without specifying the cipher system through the judgment at step S326, and breaks the one-touch operation mode.

Figure 8:
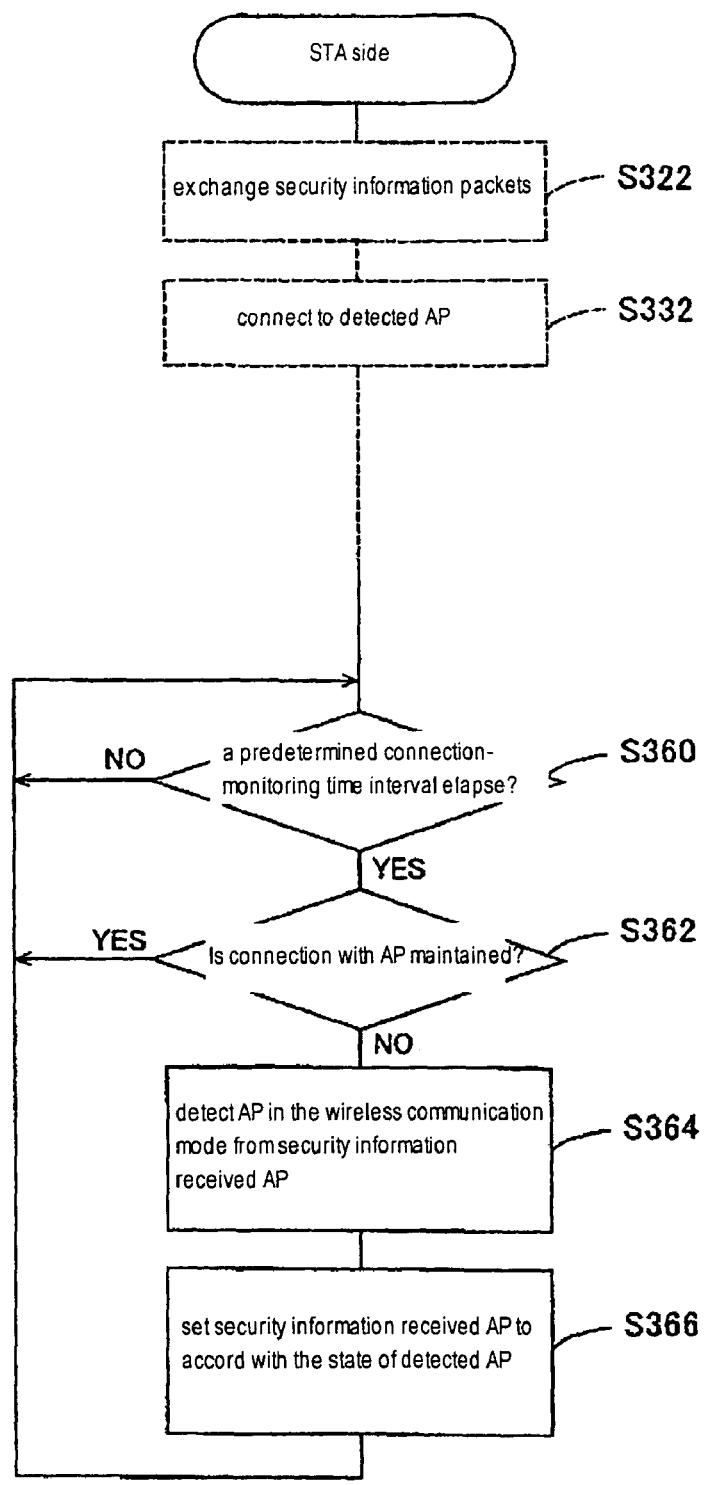
FIG. 8 is a flow chart illustrating a process of a connection-monitoring mode.

FIG. 8 shows the connection-monitoring mode in the terminals 50 and 60. Here, the dotted line parts in the drawing show only the processing related deeply with the connection-monitoring mode, on the premise that there exists the other processing.

The connection-monitoring mode is executed at step S360 through step 366, in the state that the packet exchange processing is executed at step S322 and the connection with the detected access point is maintained at step S322. In concrete, step S360 judges whether a predetermined connection-monitoring time interval elapses or not. If yes, step S362 judges whether the connection with the access point 20 is maintained or not. In other words, whether the connection with the access point 20 is maintained or not is judged every constant time intervals. If it is maintained, the processing returns to step S360 again, and the same processing is repeated during the connection every constant time intervals.

If the connection with the access point 20 is not maintained on the other hand, the terminal acquires the station ID of the accessible access point from the beacon of the receivable access point at step S364, and contrasts the above station ID with the station ID of the security information already received from the access point 20. And, if there is a coincidence in the contrast, the terminal detects that the access point 20 is in the wireless communication mode while modifying the station ID and the cipher system. The terminal sets the already received security information to accord with the state of the detected access point 20 at step S366. Thus, the terminal adopts the cipher system and cipher key associated with the modified station ID.

Figure 9:
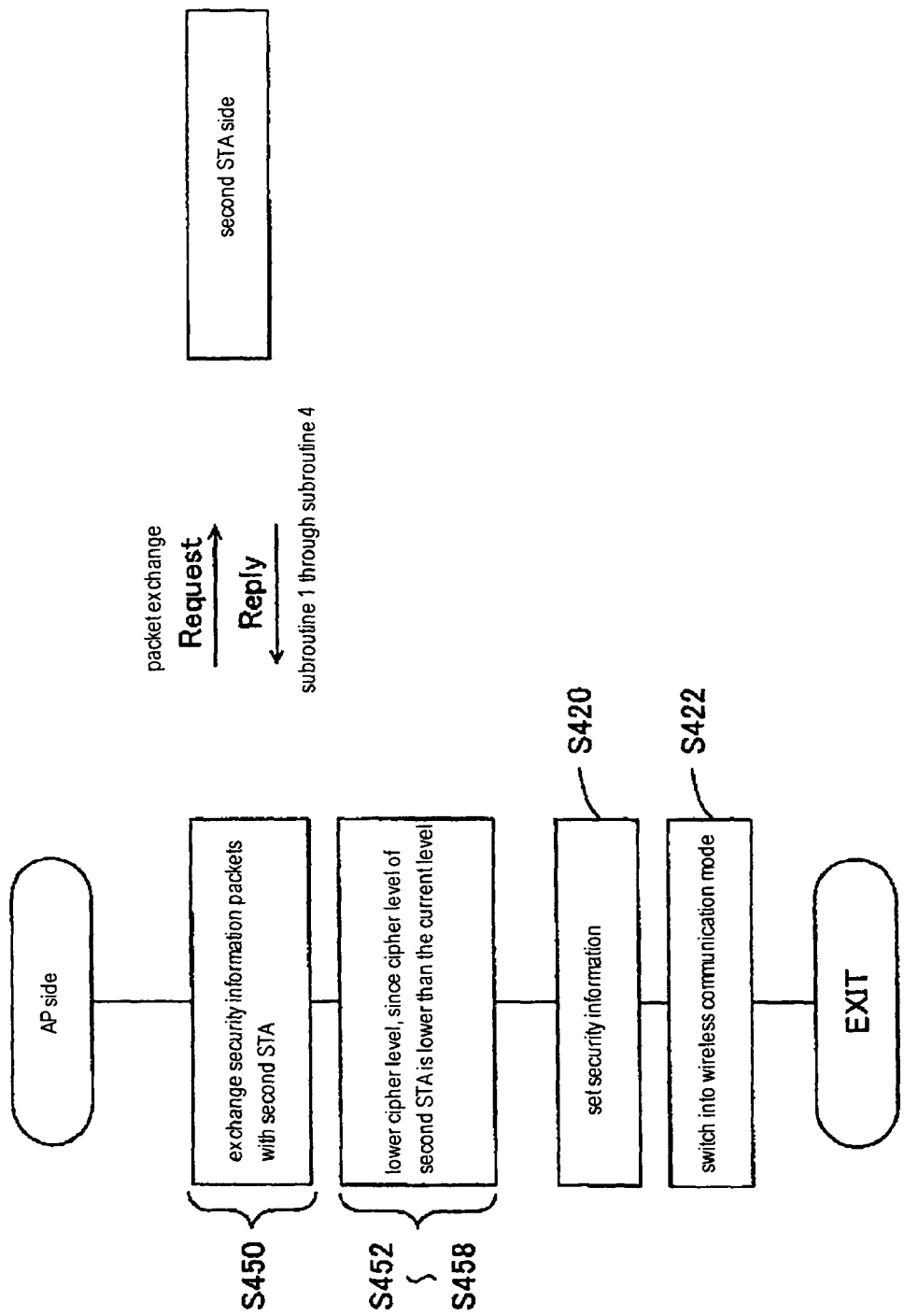
FIG. 9 is a flow chart illustrating a process of adding a terminal.

Next, the state that the cipher system is switched in this manner will be explained on the basis of the processing of the access point 20 that is created during the registering of the terminal 60. FIG. 9 specially shows the steps where the processing contents are switched in correspondence with the terminal 60 among the processing contents in the access point illustrated in FIG. 6.

On registering the terminal 60, the terminal 60 and the access point 20 each perform the packet exchange processing at steps S350 and S450. In this case, the cipher systems to which the wireless LAN adapter 62 of the terminal 60 adapts itself are the WEP 64 and WEP 128 only. Therefore, the packet exchange processing will be as follows.

Subroutine 1:
The terminal 60 sends a request for creating the security information to the access point 20.

Subroutine 2:
The access point 20 sends a reply that indicates receiving the request to the terminal 50. Here, the access point 20 has already determined the station ID and the cipher key of each of the aforementioned cipher systems when receiving the request from the terminal 50.

Subroutine 3:
The terminal 60 sends to the access point 20 the data indicating the cipher systems that the terminal 60 adapts itself to. In this case, the wireless LAN adapter 62 mounted on the terminal 60 adapts itself to the WEP 64 and WEP 128, and the terminal 60 sends the data indicating these two cipher systems.

Subroutine 4:
The access point 20 detects the cipher systems adaptable to the terminal 60 on the basis of the received data, and narrows its own adaptable cipher systems from the detected cipher systems. In concrete, the cipher systems of the terminal 60 are narrowed down to the WEP 64 and WEP 128. And, the access point 20 sends 'ESSID1' and 'DATA1' associated with the cipher system WEP 64 and 'ESSID2' and 'DATA2' associated with the cipher system WEP 128 to the terminal 60.

Thus, as the result of the packet exchange processing, the terminal 60 receives 'ESSID1' and 'DATA1' associated with the cipher system WEP 64 and 'ESSID2' and 'DATA2' associated with the cipher system WEP 128 only, which is different from the case of the terminal 50.

The access point 20 detects that the cipher systems to which the terminal 60 adapts itself are the WEP 64 and WEP 128 only, selects the WEP 128 of the highest security level out of the two at step S452, and compares the selected WEP 128 with the one of the currently adopted highest security level at step S454. Since the cipher system of the currently highest security level is the TKIP, the WEP 128 is judged to be lower in the security level than the currently highest security level at step S454, and the WEP 128 being the highest level for this time is adopted at step S458.

As the processing comes to step S420, the WEP 128 is adopted as the cipher system, the station ID and cipher key are modified into 'ESSID2' and 'DATA2', respectively. And, the mode is switched into the wireless communication mode at step S422.

In the same manner as the case with the terminal 50, the terminal 60 acquires the station ID from the beacon of the receivable access point at step S328, adopts the coincident cipher system and cipher key based on the received security information, and connects itself to the access point 20 at step S330.

On the other hand, the terminal 50 judges whether the connection with the access point 20 is maintained at step S360 and step 362. However, the station ID is switched into 'ESSID2' accompanied with the registering of the terminal 60, and the connection state having 'ESSID3' as the station ID is not maintained accordingly. As the result, while the terminal 50 detects that the station ID of the access point 20 is switched into 'ESSID2' from the beacon of the receivable access point at step S364, where the station ID shows the WEP 128 as the cipher system, the terminal 50 detects that the cipher key is 'DATA2', and sets these information. Thereafter, the terminal 50 connects itself to the access point 20 by using the set information at step S332.

Although the access point 20 did not notify the terminal 50 and the terminal 60 of the determined cipher system by a special procedure, the terminal 50 and the terminal 60 are able to specify the cipher systems and the cipher keys only from the station ID. This is very effective in the situation that the terminals are increasingly added. According to the conventional technique, once there occurs a modification on the set information in such an access point, it has been understood as a matter of course to notify the terminals of the modification. According to the technique of this invention however, only a modification of the station ID will prompt all the terminals to search the connectable access points by themselves on the basis of the communication standard IEEE802.11. As the result, the setting can be modified into the cipher system and cipher key effective at the moment only from the station ID. Therefore, it becomes unnecessary to notify all the terminals, even when the cipher systems are switched accompanied with addition of terminals, which is advantageous to the security.

Figure 10:
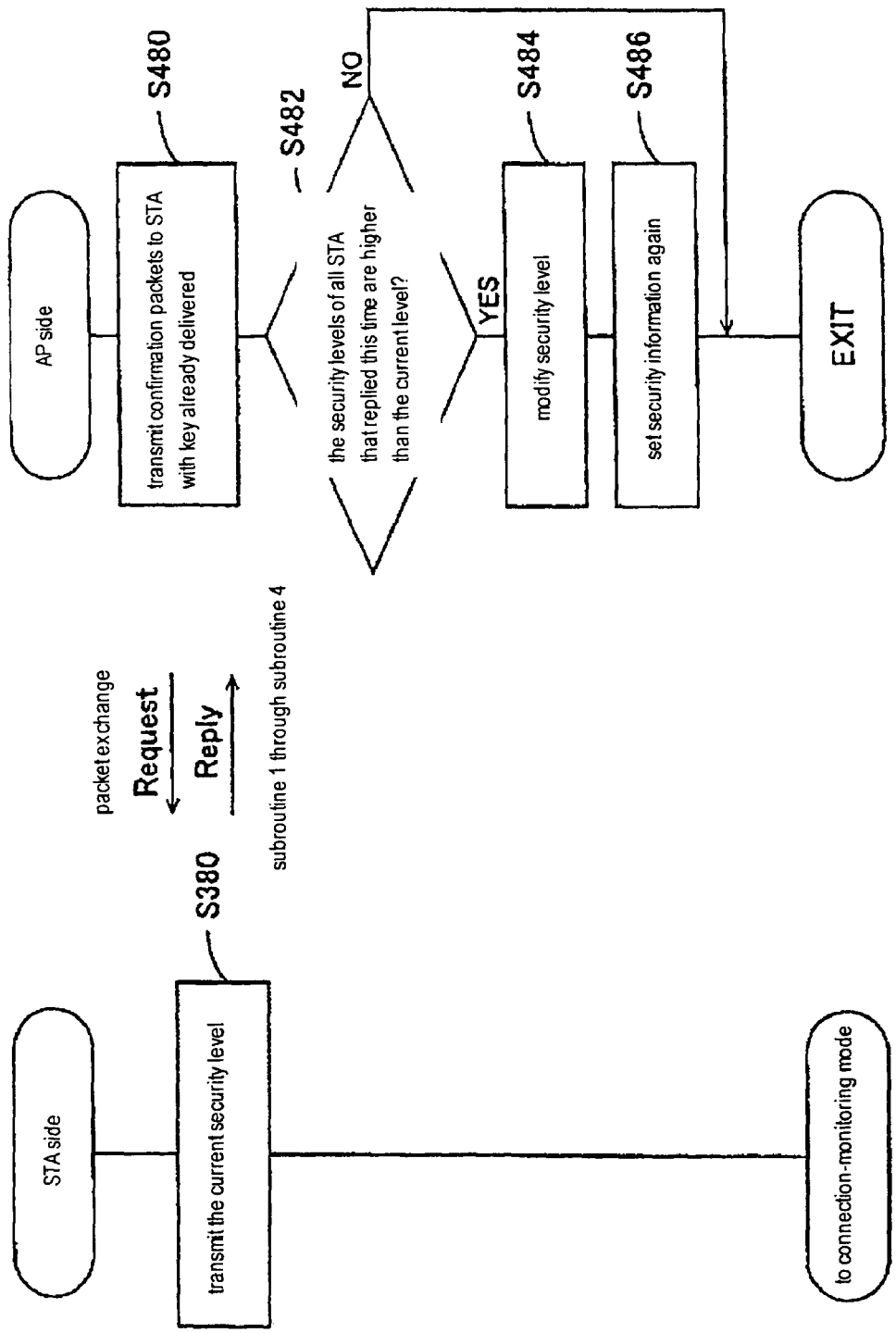
FIG. 10 is a flow chart illustrating a process of modifying a cipher system.

To perform the above processing will maintain the security level based on the security policy determined beforehand. When the security policy is modified for some reasons, or when there are margins for heightening the security level by some deficiencies, it is needed to execute the processing as shown in FIG. 10.

The access point 20 sends an affirmation packet for confirming cipher systems adaptable to all the terminals to which the cipher keys have already been delivered, at step S480.

In response to this, the terminals each reply an answer packet indicating the adaptable cipher systems at that moment at step S380. In this case, the cipher systems may be replied, or the security levels associated with the cipher systems each may be replied.

The access point 20 contrasts the cipher system of the highest security level common to all the terminals that replied this time and the cipher system that the access point 20 adopts currently, at step S482, and judges whether the security levels are lowered needlessly. If there are margins to heighten the security levels, the access point 20 modifies the cipher systems into those having the security levels enhanced at step S484, and modifies the set information at step S486. Although the access point 20 does not necessarily notify all the terminals of the modification in this case, each of the terminals is able to switch the current cipher system and cipher key into appropriate ones based on the modification of the station ID of the access point 20 in the connection-monitoring mode.

C. Modified Examples

The invention has been described based on the preferred embodiments and the drawings, however the invention is not confined to these embodiments and descriptions at all. It is natural that various modifications and changes are possible without a departure from the spirit and scope of the invention.

As an example, the above embodiments employ the WEP as the technique that enciphers the contents of data exchanged between the terminals and the access point. However, the other cipher techniques may be used instead. For example, the public key cryptosystem (the key for enciphering data and the key for deciphering the enciphered data are different) may be used instead of the WEP. It is also conceivable to use the WPA (Wi-Fi Protected Access) being a high-resilience cryptosystem.

The above embodiments perform the setting by transmitting and receiving the radio waves between the wireless LAN adapter 52 mounted on the terminal 50 and the transmitter 25 and receiver 26 of the access point 20. However, the setting may be made by the other wireless communication techniques not using the radio waves. For example, the infrared rays, laser beams, audio signals, supersonic rays, and extremely low power radio waves and so forth can be used instead. The wireless communication between the terminal 50 and the access point 20 can also be achieved by using the Bluetooth (short-range wireless communication system).

The data transmission by the aforementioned other wireless communication techniques may be used together in the constructions of the above embodiments. As an example, a construction using the data transmission by the infrared rays will be described hereunder. The differences from the constructions of the above embodiments are as follows: the access point 20 includes an infrared receiving interface mutually connected by the CPU 11 and the bus, and an infrared receiver connected to the infrared receiving interface; and the terminal 50 includes an infrared transmitting interface mutually connected by the CPU and the bus, and an infrared transmitter connected to the infrared transmitting interface.

The infrared receiver of the access point 20 includes a photodiode having a given sensitivity in the infrared range. The infrared transmitter of the terminal 50 includes an LED that emits light of which wavelength is in the infrared range. The infrared transmitting interface of the terminal 50 converts an instruction signal from the CPU into a carrier wave with this instruction signal superposed. The infrared transmitter transmits the converted carrier wave. The infrared receiver of the access point 20 receives the converted carrier wave thus transmitted from the terminal 50, in case the terminal 50 exists in a security reception area SR1 (the area in which the infrared receiver can receive the carrier wave). The infrared receiving interface, accepting the carrier wave thus received, converts the carrier wave into a command signal having the carrier wave binary-coded, and sends the command signal after converted to the CPU 11.

The infrared transmitting interface and the infrared transmitter may be incorporated into the terminal 50 in advance, and the infrared transmitter may be connected to the audio output terminal of the terminal 50.

The construction using the data transmission by the infrared rays together in the data communication using the radio waves has been described as an example. However, the data transmission by the wireless communication not using the infrared rays, but using the laser beams, audio signals, supersonic rays, and extremely low power radio waves and so forth may be used together in the data communication using the radio waves. In case of using the data transmission by visible light together, the liquid crystal device of the personal computer or the mobile information terminal or the like may be used as the light-emitting device. This makes it possible to transmit a light signal having MAC address information superposed to the access point 20 from the liquid crystal device of the terminal.

The above embodiments delimit the wireless communication area during the setting. However, the delimitation of the wireless communication area can be applied not only to the aforementioned setting, but also to the setting of other information exchanged between the access point 20 and the terminal 50. For example, in a free spot that transmits pay contents to a specific person only, there is a case in which the information (the name of the terminal owner, ID, password, etc.) for authenticating that the owner of the terminal having made an access is the specific person is registered to the access point 20 and the terminal 50 in advance. The registering of such authentication information on the specific person may be performed by the wireless communication, while delimiting the wireless communication area including the access point 20 and the terminal 50. This will save manual setting of information for authenticating a person, such as ID and password and so forth.

The foregoing invention has been described in terms of preferred embodiments. However, those skilled, in the art will recognize that many variations of such embodiments exist. Such variations are intended to be within the scope of the present invention and the appended claims.

What is claimed is:

1. A cipher key setting system, comprising:
    a wireless LAN access point that includes;
    a register mode setting mechanism set by a user that sets an operation mode of the wireless LAN access point to a register mode of operation, modifies a station Identification (ID) of the wireless LAN access point into a specified station ID, and enables the wireless LAN access point to wirelessly transmit the specified station ID;

a communication area delimiter that modifies an actual physical wireless communication area of the wireless LAN access point in the register mode of operation from a wireless LAN communication area AR1 to a smaller physical wireless LAN security communication area MR1, physically limiting a physical range of the transmitted specified station ID to the smaller, physical wireless LAN security communication area MR1;

a security policy selection mechanism that allows the user to select a security policy from a plurality of security policies included in the wireless LAN access point, and enables the user to change a previously set security policy;

a plurality of terminals that include:

a wireless LAN interface device;

a terminal registration mode mechanism that is set by the user to set a terminal operation mode of a terminal to a terminal register mode of operation, which enables the terminal to search for and directly, wirelessly connect with the wireless LAN access point that has the specified station ID;

wherein:

the plurality of terminals transmit to the wireless LAN access point a set of cipher systems used by the plurality of terminals;

the wireless LAN access point detects the set of cipher systems transmitted from the plurality of terminals, determines corresponding cipher keys based on the user modified security policy of the wireless LAN access point, and transmits selected cipher systems and cipher keys to the plurality of terminals based on the user modifiable security policy of the wireless LAN access point;

the wireless LAN access point in the register mode of operation associates different station IDs with different usable cipher systems, and transmits one or more selected station IDs from the different station IDs and one or more usable selected cipher systems from different usable cipher systems with corresponding cipher keys to the plurality of terminals;

the plurality of terminals acquire the one or more selected station IDs from the wireless LAN access point, and when there is a coincident station ID between the one or more selected station IDs acquired from the wireless LAN access point and previously stored station IDs stored in each terminal of the plurality of terminals, each terminal selects the coincident station ID and an associated cipher system with corresponding cipher keys;

when communication is not maintained with the wireless LAN access point based on already acquired station ID, the terminal of the plurality of terminals acquires anew the one or more selected station IDs from the wireless LAN access point and when there is coincident station ID between the one or more selected station IDs acquired anew and previously stored station IDs stored within the terminal, the terminal selects the coincident station ID and the associated cipher systems with corresponding cipher keys;

with the plurality of terminals and any newly added terminal being informed about which cipher system is used by the wireless LAN access point, and induced to select the associated cipher system and to set corresponding cipher keys for each selected associated cipher systems without the wireless LAN access point transmitting a new cipher key and a new cipher system each time the wireless LAN access point changes the cipher system.

2. A cipher key setting system according to claim 1, wherein:

the plurality of terminals store the cipher keys corresponding with the cipher systems transmitted from the wireless LAN access point.

3. A wireless Local Area Network (LAN) access point that adapts itself to a plurality of cipher systems in the wireless LAN communication, comprising:

a register mode setting mechanism set by a user that sets an operation mode of the wireless LAN access point to a register mode of operation, modifies a station Identification (ID) of the wireless LAN access point into a specified station ID, and enables the wireless LAN access point to wirelessly transmit the specified station ID;

a communication area delimiter that modifies an actual physical wireless communication area of the wireless LAN access point in the register mode of operation from a wireless LAN communication area AR1 to a smaller physical wireless LAN security communication area MR1, physically limiting a physical range of the transmitted specified station ID to the smaller, physical wireless LAN security communication area MR1;

cipher systems and cipher keys used in enciphering communication data prior to performing wireless communications with a terminal that is provided with a wireless LAN interfacing device, a cipher key transmitter that narrows the plurality of cipher systems in the wireless LAN access point, which were transmitted from the terminal, and determines usable cipher keys in the cipher systems narrowed, and wirelessly transmits the determined cipher keys to the terminal, and a cipher system selector that selects cipher systems on the basis of a user modifiable security policy from among the narrowed cipher systems, and sets the selected cipher systems and the determined cipher keys with the wireless LAN access point communicating with a plurality of terminals using the set cipher systems and the cipher keys;

wherein:

the wireless LAN access point in the register mode of operation associates different station IDs with different usable cipher systems, and transmits one or more selected station IDs from the different station IDs and one or more usable selected cipher systems from different usable cipher systems with corresponding cipher keys to the plurality of terminals;

the plurality of terminals acquire the one or more selected station IDs from the wireless LAN access point, and when there is a coincident station ID between the one or more selected station IDs acquired from the wireless LAN access point and previously stored station IDs stored in each terminal of the plurality of terminals, each terminal selects the coincident station ID and an associated cipher system with corresponding cipher keys;

when communication is not maintained with the wireless LAN access point based on already acquired station ID, the terminal of the plurality of terminals acquires anew the one or more selected station IDs from the wireless LAN access point and when there is coincident station ID between the one or more selected station IDs acquired anew and previously stored station IDs stored within the terminal, the terminal selects the coincident station ID and the associated cipher systems with corresponding cipher keys;

with the plurality of terminals and any newly added terminal being informed about which cipher system is used by the wireless LAN access point, and induced to select the associated cipher system and to set corresponding cipher keys for each selected associated cipher systems without the wireless LAN access point transmitting a new cipher key and a new cipher system each time the wireless LAN access point changes the cipher system.

4. A wireless Local Area Network (LAN) terminal to which is connected a wireless LAN interfacing device that adapts itself to a plurality of cipher systems in the wireless LAN communication, comprising:

a terminal registration mode mechanism that is set by the user to set a terminal operation mode of the terminal to a terminal register mode of operation, which enables the terminal to search for and directly, wirelessly connect with a wireless LAN access point with a specified station ID;

the wireless LAN access point includes:

a register mode setting mechanism set by a user that sets an operation mode of the wireless LAN access point to a register mode of operation, modifies a station Identification (ID) of the wireless LAN access point into a specified station ID, and enables the wireless LAN access point to wirelessly transmit the specified station ID;

a communication area delimiter that modifies an actual physical wireless communication area of the wireless LAN access point in the register mode of operation from a wireless LAN communication area AR1 to a smaller physical wireless LAN security communication area MR1, physically limiting a physical range of the transmitted specified station ID to the smaller, physical wireless LAN security communication area MR1;

the terminal, further includes:

a cipher system and a corresponding cipher key used in enciphering communication data prior to performing wireless communications with the wireless LAN access point, a cipher system transmitter that wirelessly transmits cipher systems from the terminal to the wireless LAN access point, and wherein:

the wireless LAN access point in the register mode of operation associates different station IDs with different usable cipher systems, and transmits one or more selected station IDs from the different station IDs and one or more usable selected cipher systems from different usable cipher systems with corresponding cipher keys to a plurality of terminals;

the plurality of terminals acquire the one or more selected station IDs from the wireless LAN access point, and when there is a coincident station ID between the one or more selected station IDs acquired from the wireless LAN access point and previously stored station IDs stored in each terminal of the plurality of terminals, each terminal selects the coincident station ID and an associated cipher system with corresponding cipher keys;

when communication is not maintained with the wireless LAN access point based on already acquired station ID, the terminal of the plurality of terminals acquires anew the one or more selected station IDs from the wireless LAN access point and when there is coincident station ID between the one or more selected station IDs acquired anew and previously stored station IDs stored within the terminal, the terminal selects the coincident station ID and the associated cipher systems with corresponding cipher keys;

with the plurality of terminals and any newly added terminal being informed about which cipher system is used by the wireless LAN access point, and induced to select the associated cipher system and to set corresponding cipher keys for each selected associated cipher systems without the wireless LAN access point transmitting a new cipher key and a new cipher system each time the wireless LAN access point changes the cipher system.

5. A cipher key setting method that sets a cipher system and a cipher key used in enciphering communication data prior to wireless communications performed between a wireless Local Area Network (LAN) access point and a terminal with a wireless LAN interfacing device, comprising:

setting an operation mode of the wireless LAN access point to a register mode of operation, modifying a station Identification (ID) of the wireless LAN access point into a specified station ID, and wirelessly transmitting the specified station ID;

modifying an actual physical wireless communication area of the wireless LAN access point in the register mode of operation from a wireless LAN communication area AR1 to a smaller physical wireless LAN security communication area MR1, physically limiting a physical range of the transmitted specified station ID to the smaller, physical wireless LAN security communication area MR1;

selecting a security policy from a plurality of security policies included in the wireless LAN access point, and changing a previously set security policy;

setting a terminal operation mode of the terminal to a terminal register mode of operation, searching for and directly, wirelessly connecting with the wireless LAN access point that has the specified station ID;

wirelessly transmitting to the wireless LAN access point a set of cipher systems used by a plurality of terminals;

communicating with the plurality of terminals using the set of cipher systems and cipher keys;

selecting one or more cipher systems from the set of cipher systems transmitted from the terminal, determining a usable cipher key in the one or more cipher systems selected, and transmitting the determined cipher key to the terminal on a basis of a user modifiable security policy determined in advance, and setting the selected cipher system and the determined cipher key; and the terminal setting the cipher key of the cipher system transmitted from the wireless LAN access point;

associating different station IDs with different usable cipher systems when the wireless LAN access point is in the register mode of operation;

transmitting one or more selected station IDs from the different station IDs and one or more usable selected cipher systems from different usable cipher systems with corresponding cipher keys to the plurality of terminals;

the plurality of terminals acquiring the one or more selected station IDs from the wireless LAN access point, and when there is a coincident station ID between the one or more selected station IDs acquired from the wireless LAN access point and previously stored station IDs stored in each terminal of the plurality of terminals, each terminal selecting the coincident station ID and an associated cipher system with corresponding cipher keys;

when communication is not maintained with the wireless LAN access point based on already acquired station ID, the terminal of the plurality of terminals acquiring anew the one or more selected station IDs from the wireless LAN access point and when there is coincident station ID between the one or more selected station IDs acquired anew and previously stored station IDs stored within the terminal, the terminal selecting the coincident station ID and the associated cipher systems with corresponding cipher keys;

with the plurality of terminals and any newly added terminal being informed about which cipher system is used by the wireless LAN access point, and induced to select the associated cipher system and to set corresponding cipher keys for each selected associated cipher systems without the wireless LAN access point transmitting a new cipher key and a new cipher system each time the wireless LAN access point changes the cipher system.

* * * * *